(12) United States Patent
Pellegrino

(10) Patent No.: US 7,240,890 B1
(45) Date of Patent: Jul. 10, 2007

(54) VEHICLE STORM PROTECTION ASSEMBLY

(76) Inventor: Robert L. Pellegrino, 18004 Lookout Valley, Flint, TX (US) 75762

( * ) Notice: Subject to any disclaimer, the term of this patent is extended or adjusted under 35 U.S.C. 154(b) by 240 days.

(21) Appl. No.: 10/891,296

(22) Filed: Jul. 15, 2004

Related U.S. Application Data

(60) Provisional application No. 60/491,617, filed on Jul. 30, 2003.

(51) Int. Cl.
*A47B 97/00* (2006.01)
(52) U.S. Cl. .............. 248/503; 248/500; 248/505; 410/100
(58) Field of Classification Search ........... 248/503, 248/500, 505; 410/11, 102, 106–113, 99–104, 410/96, 97, 35, 46, 115, 116; 135/88.13; 52/23, 4, DIG. 12
See application file for complete search history.

(56) References Cited

U.S. PATENT DOCUMENTS

| | | | |
|---|---|---|---|
| 2,995,137 A | 8/1961 | Cothern | |
| 3,054,151 A * | 9/1962 | Shankland | 52/23 |
| 3,904,154 A * | 9/1975 | Jones | 244/110 R |
| 3,945,159 A | 3/1976 | Girnus, Sr. | |
| 5,579,794 A * | 12/1996 | Sporta | 135/88.01 |
| D377,928 S | 2/1997 | Tillery | |
| 6,059,105 A | 5/2000 | Allain et al. | |
| 6,273,113 B1 * | 8/2001 | Streyckmans | 135/88.13 |
| 6,276,381 B1 | 8/2001 | O'Brien | |
| 6,524,041 B1 * | 2/2003 | Voiculescu | 410/100 |
| 6,711,786 B2 * | 3/2004 | Mamie et al. | 24/68 CD |
| 2002/0166289 A1 | 11/2002 | Oviedo-Reyes | |

\* cited by examiner

*Primary Examiner*—Gwendolyn Baxter

(57) ABSTRACT

An assembly for maintaining a vehicle at a stationary position during inclement weather conditions includes a support surface and a plurality of housings disposed about the vehicle. The housings include an open top end and a lid. A plurality of flexible straps having opposed end portions are engageable with the vehicle along a traversing plane. The assembly further includes a mechanism for securing the plurality of flexible straps to the plurality of housings.and a mechanism for adjusting a length of the plurality of flexible straps for obtaining a desired tension between the opposed end portions thereof.

10 Claims, 3 Drawing Sheets

VEHICLE STORM PROTECTION ASSEMBLY

CROSS REFERENCE TO RELATED APPLICATIONS

The present application claims the benefit of U.S. provisional patent application No. 60/491,617 having a fling date of Jul. 30, 2003.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle protection assembly and, more particularly, to a vehicle storm protection assembly for use during inclement weather.

2. Prior Art

The use of vehicle protection assemblies is known in the art. Such assemblies typically include a cover to protect an automobile from water damage. None of these covers, however, includes anchoring means for preventing an enclosed vehicle from being elevated off of the ground in the event of a tornado or hurricane.

Protective vehicle covers come in all shapes and sizes. Of course, the most permanent type of vehicle cover is the "attached" or "detached" garage, which is either connected to a residence or situated adjacent thereto, but still within the property line. The least permanent type of covering for a large object such as a motor vehicle is usually in the form of a weather-resistant, one-piece cover, or custom-designed fitted cover.

For vehicle owners residing in apartment buildings without attached or detached garages, for example, this is usually the only available option. Obviously, the most expensive and effective type of covering is the garage. However, one-piece fitted covers and the like can also become expensive if they are stolen, which is often a problem in today's society, or if the owner changes cars, thereby necessitating the purchase of a new "fitted" cover. Furthermore, these covers, even in the case of a garage, do not provide adequate vehicle stabilizing protection to a car during the event of a hurricane or tornado.

Accordingly, a need remains for a vehicle protection assembly that would overcome the above-noted short comings. The present invention satisfies such a need by providing a protection assembly that would be effective, yet small in size, easy to deploy and simple in design.

BRIEF SUMMARY OF THE INVENTION

In view of the foregoing background, it is therefore an object of the present invention to provide a vehicle storm protection assembly that enables a motor vehicle to be used as a safe haven in the event of a tornado or other high-speed windstorm. These and other objects, features, and advantages of the invention are provided by an assembly for protecting a vehicle and maintaining it at a stationary position during inclement weather conditions and further for providing an alternate to prefabricated storm shelters or storm rooms.

The assembly includes a substantially planar support surface formed from concrete that has a top surface area sized and shaped for receiving a vehicle thereon. Such a support surface is formed from rigid material that has a sufficient density for effectively absorbing external forces acting thereon during operating conditions.

The assembly also includes a plurality of housings having a substantially rectangular shape selectively disposed at subterranean locations spaced about the vehicle and adjacent to the vehicle tires. Such housings have an open top end positioned substantially flush with a ground level and include a lid removably positionable over the top end thereof.

The present invention further includes a plurality of flexible straps engageable with selected portions of the vehicle along a traversing plane wherein opposed end portions of the straps become disposed on passenger and driver sides of the vehicle respectively. The assembly further includes a mechanism for selectively securing the straps to the housings so that the vehicle can advantageously be maintained at a substantially stable position during operating conditions. Such a securing mechanism preferably includes a plurality of rigid fastening members threadably passing through the housings respectively, and disposed subjacent the support member. The securing mechanism further includes a plurality of offset anchor plates secured to the housings via select ones of the fastening members.

The present invention also includes a mechanism for adjusting a length of the straps for obtaining a desired tension between the opposed end portions thereof. Such an adjusting mechanism preferably includes a plurality of ratchets connected to the straps respectively. The ratchets include pivot arms movable along a predetermined arcuate path for conveniently feeding and releasing a selected portion of the straps respectively. Such ratchets each further preferably include a flexible extension connected thereto so that a user can advantageously maneuver the ratchets downwardly and away from the vehicle and into the respective housings during installation procedures.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
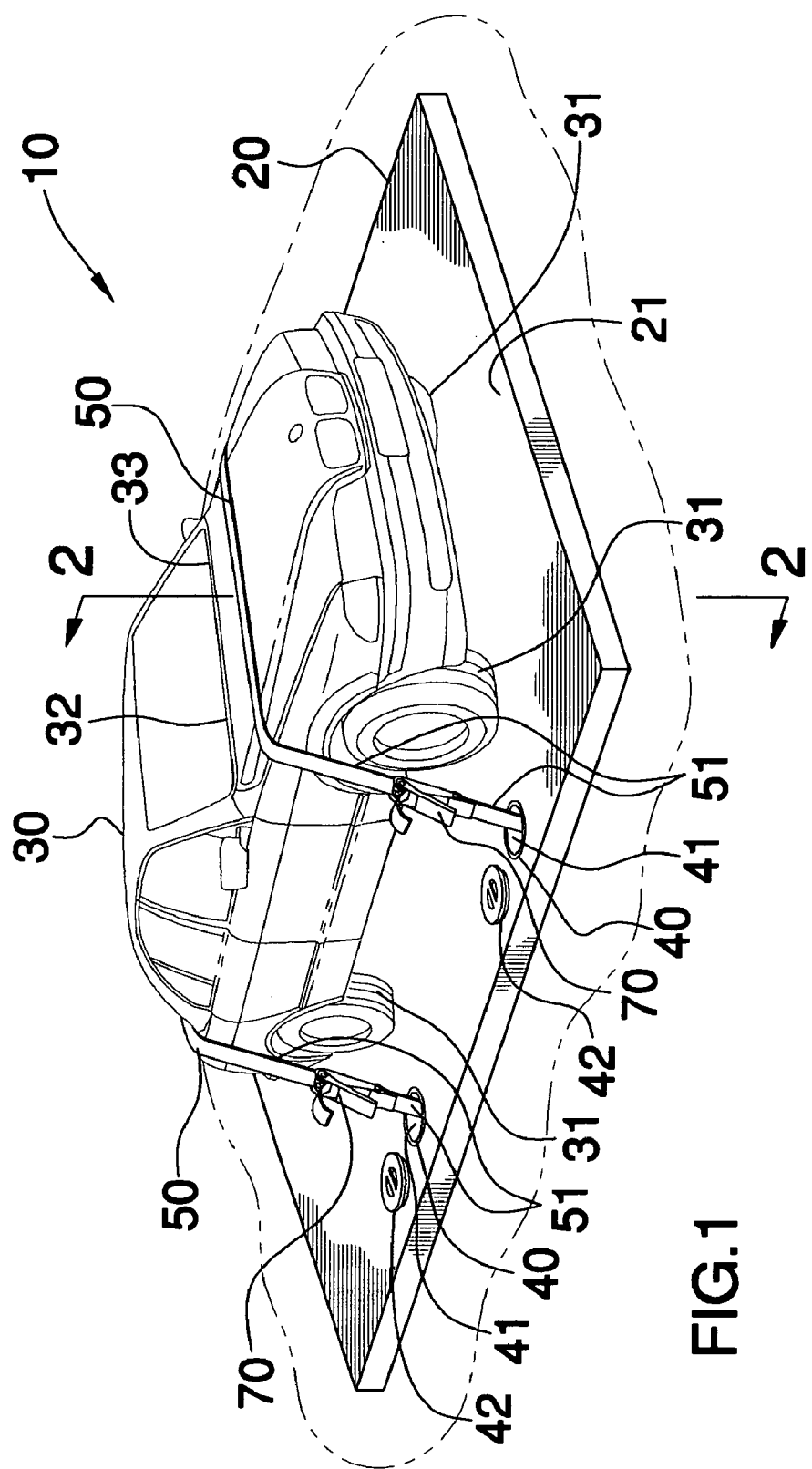
FIG. 1 is a perspective view showing a vehicle storm protection assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-4 by the reference numeral 10 and is intended to provide a vehicle storm protection assembly. It should be understood that the assembly 10 may be used to protect many different types of vehicles and should not be limited to only cars.

Referring initially to FIG. 1, the assembly 10 includes a substantially planar support surface 20 formed from concrete that has a top surface area 21 sized and shaped for receiving a vehicle 30 thereon. Such a support surface 20 is formed from rigid material having a sufficient density for effectively absorbing external forces acting thereon during operating conditions and thereby preventing the malfunction of the assembly 10.

Figure 2:
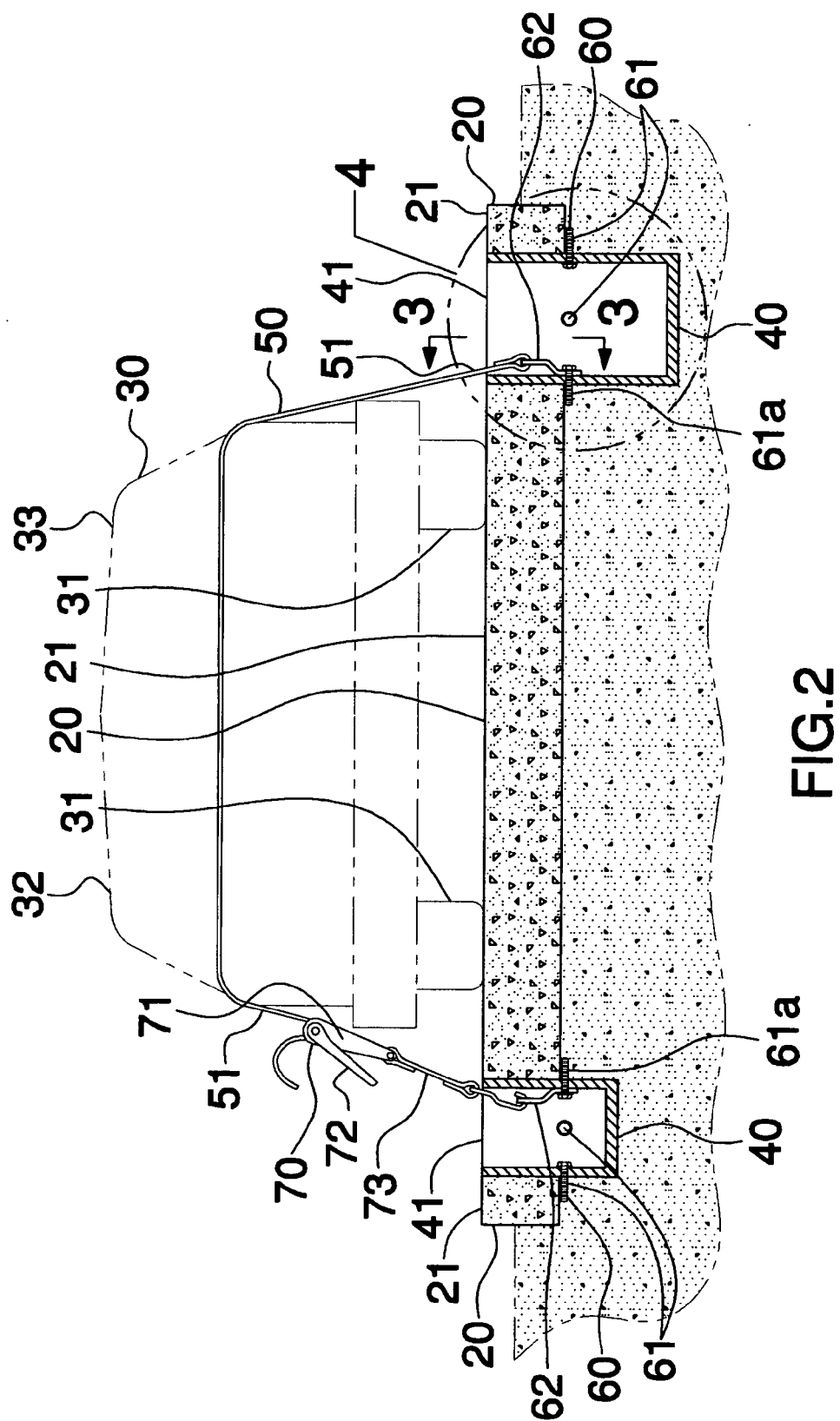
FIG. 2 is a cross-sectional view of the assembly shown in FIG. 1, taken along line 2-2.

As is shown in FIGS. 1 and 2, the assembly 10 also includes a plurality of housings 40 having a substantially rectangular shape selectively disposed at subterranean locations spaced about the vehicle 30 and adjacent to the vehicle tires 31. Such housings 40 have an open top end 41 positioned substantially flush with a ground level and include a lid 42 removably positionable over the top end 41 thereof. The lid 42 conveniently covers the housings 40 during non-operating conditions, advantageously preventing an individual from stepping into the housing and sustaining an injury. Such a lid 42 further increases the aesthetic look of the assembly 10 and prevents tampering therewith during non-operating conditions.

The present invention further includes a plurality of flexible straps 50 engageable with selected portions of the vehicle 30 along a traversing plane wherein opposed end portions 51 of the straps 50 become disposed on passenger 32 and driver 33 sides of the vehicle 30 respectively, as illustrated in FIGS. 1 and 2.

Figure 4:
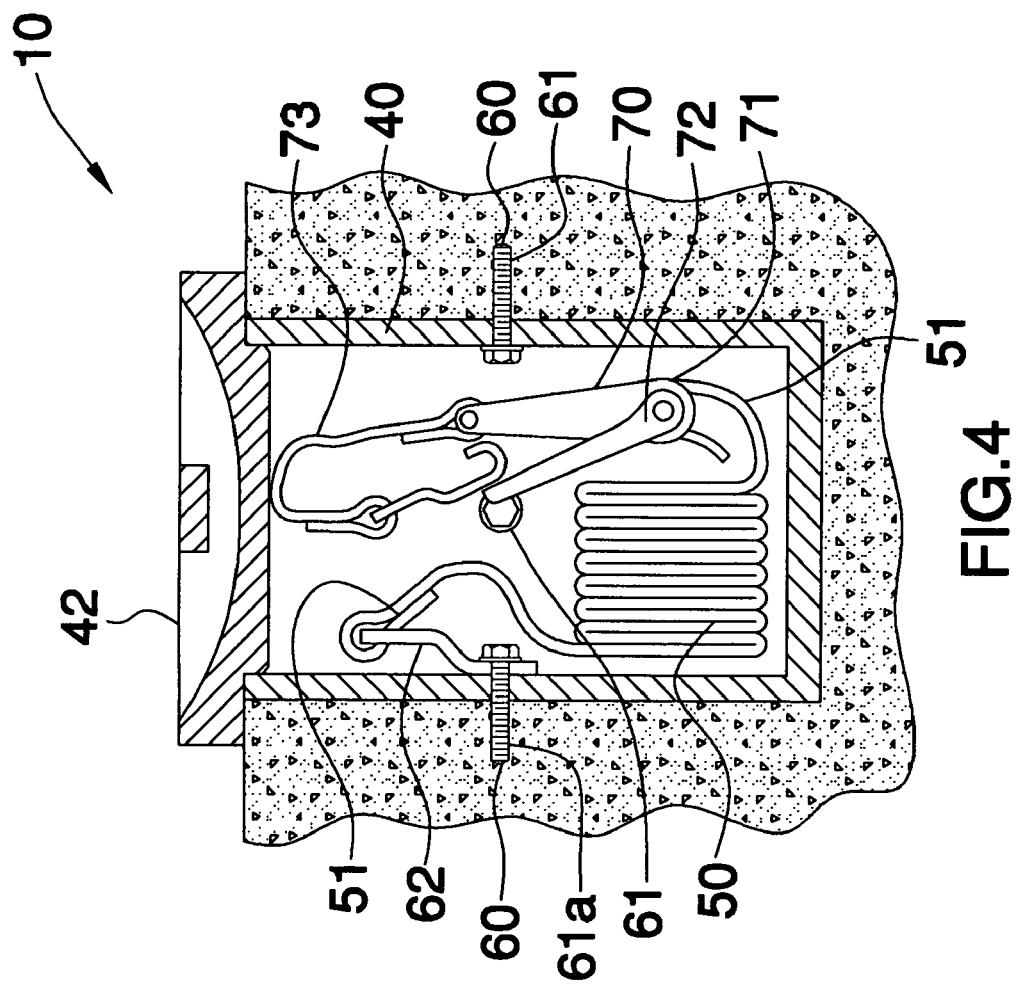
FIG. 4 is a partially enlarged cross-sectional view of the housing shown in FIG. 2.
Figure 3:
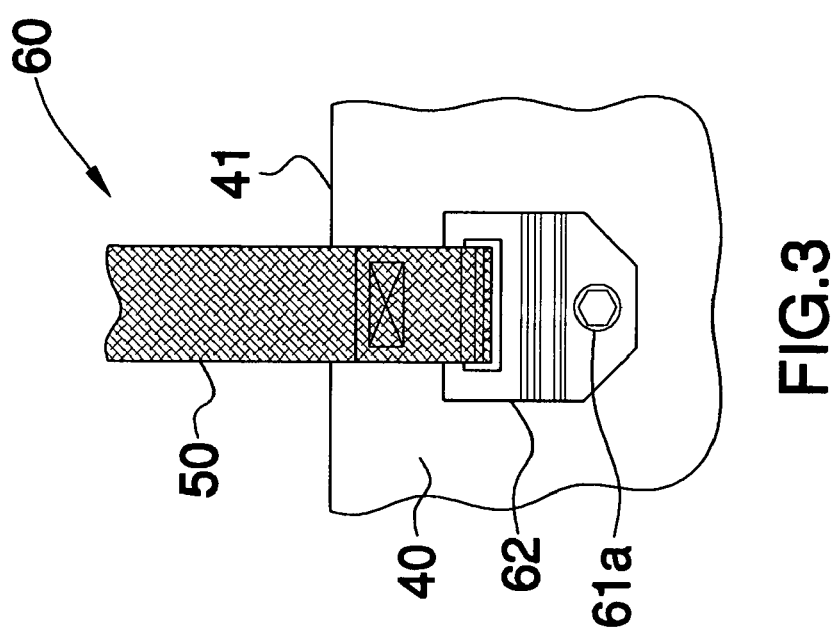
FIG. 3 is an enlarged side view of the securing mechanism.

As shown in FIG. 3, the assembly 10 further includes a mechanism 60 for selectively securing the straps 50 to the housings 40 so that the vehicle 30 can advantageously be maintained at a substantially stable position during operating conditions. Such a securing mechanism 60 includes a plurality of rigid fastening members 61 threadably passing through the housings 40 respectively, and disposed subjacent the support member 20. The securing mechanism 60 further includes a plurality of offset anchor plates 62 secured to the housings 40 via select ones 61a of the fastening members 61, as shown in FIGS. 3 and 4. Such anchor plates 62 effectively ensure that the straps 50 will remain secure during operating conditions.

As illustrated in FIG. 2, the present invention also includes a mechanism 70 for adjusting a length of the straps 50 for obtaining a desired tension between the opposed end portions 51 thereof. Such an adjusting mechanism 70 includes a plurality of ratchets 71 connected to the straps 50 respectively. The adjusting mechanism 70 advantageously allows the assembly 10 to be used for vehicles of differing sizes, thus increasing the versatility and functionality of the assembly 10.

The ratchets 71 include pivot arms 72 movable along a predetermined arcuate path for conveniently feeding and releasing a selected portion of the straps 50 respectively. Such ratchets 71 each further include a flexible extension 73 connected thereto so that a user can advantageously maneuver the ratchets 71 downwardly and away from the vehicle 30 and into the respective housings 40 during installation procedures.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An assembly for maintaining a vehicle at a stationary position during inclement weather conditions, said assembly comprising:

a substantially planar support surface having a top surface area sized and shaped for receiving the vehicle thereon, said support surface being formed from rigid material having a sufficient density for absorbing external forces acting thereon during operating conditions;

a plurality of housings selectively disposed at subterranean locations spaced about the vehicle, said housings having an open top end positioned substantially flush with a ground level;

a plurality of flexible straps engageable with selected portions of the vehicle along a traversing plane wherein opposed end portions of said straps become disposed on passenger and driver sides of the vehicle respectively;

means for selectively securing said straps to said housings so that said vehicle can be maintained at a substantially stable position during said operating conditions; and means for adjusting a length of said straps for obtaining a desired tension between said opposed end portions thereof;

wherein said adjusting means comprises a plurality of ratchets connected to said straps respectively, said ratchets including pivot arms movable along a predetermined accurate path for feeding and releasing a selected portion of said straps respectively;

wherein said ratchets each further comprise a flexible extension connected thereto so that a user can maneuver said ratchets downwardly and away from the vehicle and into said respective housings during installation procedures;

wherein said securing means comprises a plurality of rigid fastening members threadably passing through said housings respectively and being disposed subjacent said support member; and a plurality of offset anchor plates secured to said housings via select ones of said fastening members.

2. The assembly of claim 1, wherein said housings are disposed adjacent to the vehicle tires.

3. An assembly for maintaining a vehicle at a stationary position during inclement weather conditions, said assembly comprising:
- a substantially planar support surface formed from concrete and having a top surface area sized and shaped for receiving the vehicle thereon, said support surface being formed from rigid material having a sufficient density for absorbing external forces acting thereon during operating conditions;
- a plurality of housings selectively disposed at subterranean locations spaced about the vehicle, said housings having an open top end positioned substantially flush with a ground level;
- a plurality of flexible straps engageable with selected portions of the vehicle along a traversing plane wherein opposed end portions of said straps become disposed on passenger and driver sides of the vehicle respectively;
- means for selectively securing said straps to said housings so that said vehicle can be maintained at a substantially stable position during operating conditions; and
- means for adjusting a length of said straps for obtaining a desired tension between said opposed end portions thereof;
- wherein said securing means comprises
- a plurality of rigid fastening members threadably passing through said housings respectively and being disposed subjacent said support surface; and
- a plurality of offset anchor plates secured to said housings via select ones of said fastening members.

4. The assembly of claim 3, wherein said adjusting means comprises:
- a plurality of ratchets connected to said straps respectively, said ratchets including pivot arms movable along a predetermined accurate path for feeding and releasing a selected portion of said straps respectively.

5. The assembly of claim 4, wherein said ratchets each further comprise:
- a flexible extension connected thereto so that a user can maneuver said ratchets downwardly and away from the vehicle and into said respective housings during installation procedures.

6. The assembly of claim 5, wherein said housings are disposed adjacent to the vehicle tires.

7. An assembly for maintaining a vehicle at a stationary position during inclement weather conditions, said assembly comprising:
- a substantially planar support surface formed from concrete and having a top surface area sized and shaped for receiving the vehicle thereon, said support surface being formed from rigid material having a sufficient density for absorbing external forces acting thereon during operating conditions;
- a plurality of housings selectively disposed at subterranean locations spaced about the vehicle, said housings having an open top end positioned substantially flush with a ground level, each said housing comprising a lid removably positionable over the top end thereof;
- a plurality of flexible straps engageable with selected portions of the vehicle along a traversing plane wherein opposed end portions of said straps become disposed on passenger and driver sides of the vehicle respectively;
- means for selectively securing said straps to said housings so that said vehicle can be maintained at a substantially stable position during operating conditions; and
- means for adjusting a length of said straps for obtaining a desired tension between said opposed end portions thereof;
- wherein said securing means comprises
- a plurality of rigid fastening members threadably passing through said housings respectively and being disposed subjacent said support surface; and
- a plurality of offset anchor plates secured to said housings via select ones of said fastening members.

8. The assembly of claim 7, wherein said adjusting means comprises:
- a plurality of ratchets connected to said straps respectively, said ratchets including pivot arms movable along a predetermined arcuate path for feeding and releasing a selected portion of said straps respectively.

9. The assembly of claim 8, wherein said ratchets each further comprise:
- a flexible extension connected thereto so that a user can maneuver said ratchets downwardly and away from the vehicle and into said respective housings during installation procedures.

10. The assembly of claim 7, wherein said housings are disposed adjacent to the vehicle tires.

* * * * *